F. G. ALLEN.
SET SQUARE.
APPLICATION FILED NOV. 30, 1914.
1,146,608.
Patented July 13, 1915.
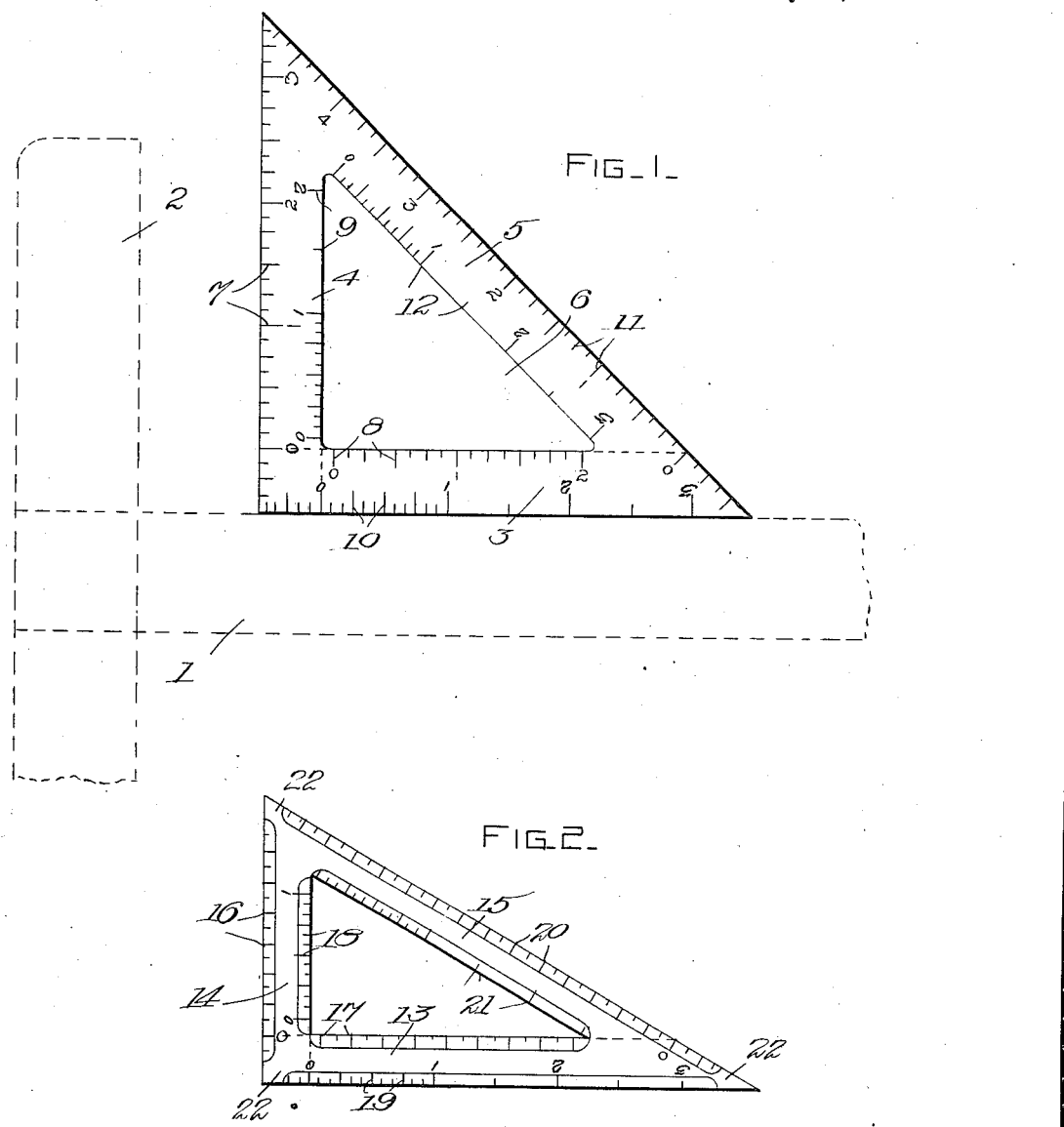

UNITED STATES PATENT OFFICE.

FRANK G. ALLEN, OF BOULDER, COLORADO.

SET-SQUARE.

1,146,608.  Specification of Letters Patent.  Patented July 13, 1915.

Application filed November 30, 1914. Serial No. 874,811.

*To all whom it may concern:*

Be it known that I, FRANK G. ALLEN, a citizen of the United States, and a resident of Boulder, in the county of Boulder and State of Colorado, have made certain new and useful Improvements in Set-Squares, of which the following is a specification.

My invention is an improvement in drafting instruments, of the character particularly described as set squares, and the invention has for its object to combine in a single instrument of the type in question a number of scales or measures, in such manner that when used in connection with a T-square, horizontal, vertical or inclined lines may be drawn and measured at a single operation.

In the drawings: Figure 1 is a top plan view of the improved instrument in use, and Fig. 2 is a similar view of another embodiment of the invention.

The embodiment of the invention shown in Fig. 1 is used in connection with a T-square consisting of a body 1 and a head 2 connected to the body in the usual manner at one end thereof and at right angles to the body. The instrument which may be constructed of any desired material, as for instance wood, metal, celluloid, paste board or the like, consists of three portions, namely a base 3, a side 4, at right angles to the base, and a hypotenuse 5 connecting the remote ends of the base and the side.

The base, side and hypotenuse are of equal width, and the triangular opening 6 at the center is preferably of as large area as may be consistent with sufficient strength and rigidity of the square as a whole. The inner edges of the base, side and hypotenuse are parallel with the outer edges, so that when for instance the base 3 is set with its outer edge against the T-square body, both the inner and outer edges of the side 3 will be parallel with the edges of the body of the T-square.

Each edge of the base, side and hypotenuse is provided with a scale, and the graduations of the scale may be of any desired unit of measurement. It will be noted that the scale 7 on the outer edge of the side 4 is similar to the scale 8 on the inner edge of the base, while the scale 9 on the inner edge of the side 4 is similar to the scale 10 on the outer edge of the base 3. That is, there are two sets each set consisting of two scales, and the two scales are at right angles to each other. With this arrangement lines at right angles to each other will be laid off and measured at the same time. The scales 7 and 10 have their commencement at the angle formed between the inner edges of the side and base, scale 7 extending upward from its commencement or zero mark, and scale 10 extending to the right from its commencement. Other graduations are, however, provided in connection with the scale 7, between the inner edge of the base and the outer edge, and in connection with scale 10 between the inner edge of the side and the outer edge. The inner corners between the inner edges of the base, side and hypotenuse may be rounded by small arcs, as shown in Fig. 1, this being especially desirable to prevent cracking at the corners when the instrument is made of celluloid. Scales 8 and 9 should have their commencement near the intersection of the base and side, but far enough from said intersection to clear said rounded inner corner and to fall upon the straight part of said inner edges, as shown in Fig. 1. By the particular arrangement of scales, after a line has been drawn along the inner edge of the base, the zero mark of scale 7 may be brought to this line by merely sliding the set square to the right along the body of the T-square, without moving the T-square. The set square will then be in position to measure and draw along the outer edge of the side 4 a line at right angles to the line just drawn along the inner edge of the base, the scale 7 being in proper position to begin the measurement exactly from the line drawn along the inner edge of the base.

The outer edge of the hypotenuse should be provided with a linear scale 11 of the same unit of measurement as that of the scales 7 and 8, and the zero mark or commencement should be in line with the inner edge of the base 3. When the improved square is made from celluloid or like transparent material, the graduation marks should be on the under side of the square, so as to read correctly when viewed through the body of the set square. Errors due to parallax are thus avoided. The inner edge of the hypotenuse is also provided with a scale 12 of the same unit of measurement as that of the scales 9 and 10.

If the instrument be made of metal or other opaque material, the side edges of the base, side and hypotenuse may be beveled to avoid errors due to parallax. This arrangement is shown in Fig. 2, wherein the set square consists of a base 13, a side 14 at right angles thereto, and a hypotenuse 15. The scales 16, 17, 18, 19, 20 and 21 corresponding in position and arrangement to the scales 7, 8, 9, 10, 11 and 12 respectively, are arranged on beveled surfaces, each beveled surface at the outer edges extending from near one angle to near the other. A space, however, is left at each angle of the instrument at the outer edge, as indicated at 22, not beveled, in order to prevent the set square from slipping too easily under the body of the T-square. These plain surfaces 22 provide for a shoulder at each end of each side of the set square for engaging the edge of the body of the T-square to hold the set square in position. At the inner edge of the side, base and hypotenuse the bevel may extend the full length of the edge.

The invention consists in fact of providing scales two or more, in connection with the ordinary form of set square used by draftsmen in laying off lines, and the scales should be at one inner and one outer edge, and preferably at right angles to each other, the commencement of the scale at the outer edge being in line with that inner edge at which a scale is provided with the same units of measurement as those of the scale at said outer edge, the edges having the scales being parallel to the adjacent edges.

In use, the set square is used in connection with a T-square in the ordinary manner, as shown in Fig. 1. When the square is placed with the outer edge of the base 3 against the body 1 of the T-square, a line may be drawn and measured along the inner edge of the base 3. Then the zero mark of the scale 7 may be brought upon this line by sliding the set square to the right along the body of the T-square without moving the T-square. The set square will then be in position to measure and draw along the edge at the scale 7 a line at right angles to the line just drawn along the edge of the scale 8, the scale 7 being in proper position to begin the measurement exactly from the line drawn along the scale 8. In order to extend the usefulness of the instrument, the linear scales 9, 10 and 12 may have a different unit of measurement from the scales 7, 8 and 11.

I claim:

A set square consisting of a base and a side at a right angle to each other and a hypotenuse connecting the remote ends of the base and the side, the inner edges of the base, side and hypotenuse being parallel to the outer edges of the base, side and hypotenuse respectively, the inner and outer edges of the base, side and hypotenuse having scales, the zero marks of the scales at the outer edge of the base and side being in line with the inner edge of the side and base respectively, and the zero mark of the scale at the outer edge of the hypotenuse being in line with the inner edge of the base, and each scale at an outer edge having extensions in both directions from its zero mark, the zero marks of the scales at the inner edge of the base and the inner edge of the side being near the intersection of said inner edges, and the zero mark of the scale at the inner edge of the hypotenuse being near the intersection of the inner edge of the hypotenuse and the inner edge of the side.

FRANK G. ALLEN.

Witnesses:
 Jno. Mossman,
 J. E. De Kalb.